Aug. 30, 1960     M. R. SHAFFER ET AL     2,951,163
VERSATILE SOLAR POWERED RADIO RECEIVER OR THE LIKE
Filed Aug. 3, 1956

MARLIN R. SHAFFER
ROBERT L. WEISBRICH
*INVENTORS*

BY

THEIR ATTORNEY

United States Patent Office 2,951,163
Patented Aug. 30, 1960

2,951,163

VERSATILE SOLAR POWERED RADIO RECEIVER OR THE LIKE

Marlin R. Shaffer, North Hollywood, and Robert L. Weisbrich, Compton, Calif., assignors to Hoffman Electronics Corporation, a corporation of California Filed Aug. 3, 1956, Ser. No. 602,002

4 Claims. (Cl. 250—212)

This invention is related in the main to radio receivers of the portable variety, and more particularly to a new and improved radio receiver employing as a battery charging device a plurality of solar cells, and utilizing therewith a novel retractable, reflective apparatus which, when in open position, may be selectively adjusted for maximum photon impingement upon the aforementioned solar cells for all relative dispositions of the sun with respect thereto and, when in closed disposition, will offer a considerable measure of protection for the solar cells employed.

The term "solar cell" is employed to indicate broadly any type of photo-voltaic device which is responsive to photon impingement thereon from the sun or any light source so as to produce an electrical current suitable for charging, for example, one or a plurality of intercoupled battery cells. However, the present invention is concerned particularly with the employment by portable radio receivers of photo-voltaic devices of the semiconductor variety which are provided with P–N junctions in proximate relation with the surfaces of such devices. Of particular interest to the electronics industry and also to the public at large is the application of photo-voltaic devices as charging means for rechargeable batteries as may be employed in portable radio receivers. At the present time certain types of cadmium dry cell batteries extant are capable of being recharged almost an indefinite number of times. It would, of course, be highly desirable if photon energy from the sun or another light source might be utilized to charge such batteries as might be incorporated in portable radio receivers. Accordingly, a few engineering concerns have concentrated their efforts upon solar powered portable radio receivers employing solar cells disposed either upon the handle of the receiver or the back portion thereof. Since it is desirable to make such receivers as small and compact as possible, it would be ideal to mount the requisite number of solar cells in proximity with the back portion of the receiver, facing of course toward the rear of the receiver and being in exposed relationship to the ambient atmosphere. However, in the absence of appropriate reflective means, it it apparent that for substantially half the daylight hours, for a given disposition of the receiver, the solar cells will receive no direct radiation from the sun, for example, for the reason that the solar cells are faced in one direction only; hence, during at least some hours of the day the solar cells will be disposed in the shadow of the receiver. It has occurred to the inventors that it would be highly desirable to have a suitable reflective means associated with the receiver which may be selectively extended and adjusted for maximum reflection of the sun's rays toward the receiver solar cells, and which might also be easily folded and retracted into closed position so as to protect the solar cells during intervals of conveyance of the receiver.

Therefore, it is an object of the present invention to provide appropriate reflective apparatus for a plurality of inter-related solar cells, with the apparatus being adjustable and selectively retractable.

It is the further object of the present invention to provide a new and useful versatile solar powered radio receiver of the portable type, for which there is provided a selectively extendable reflective means adapted for easy adjustment and selective retraction and retention during the retractive disposition thereof.

It is a still further object of the present invention to provide a novel, versatile solar powered radio receiver in which is provided novel reflective means which may be selectively extended, and retracted, as desired, which means may be adapted for the incorporation thereon of an exterior plastic, leather, or imitation leather panel, which panel will be disposed exteriorly during intervals at which the reflective means is retracted.

According to the present invention, a plurality of electrically intercoupled solar cells are disposed upon the back portion of a portable radio receiver, for example, which receiver incorporates a selectively extendable reflective means of novel configuration. The reflective means is adapted for selectable disposition for maximum efficiency of the receiver during substantially all of the daylight hours.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
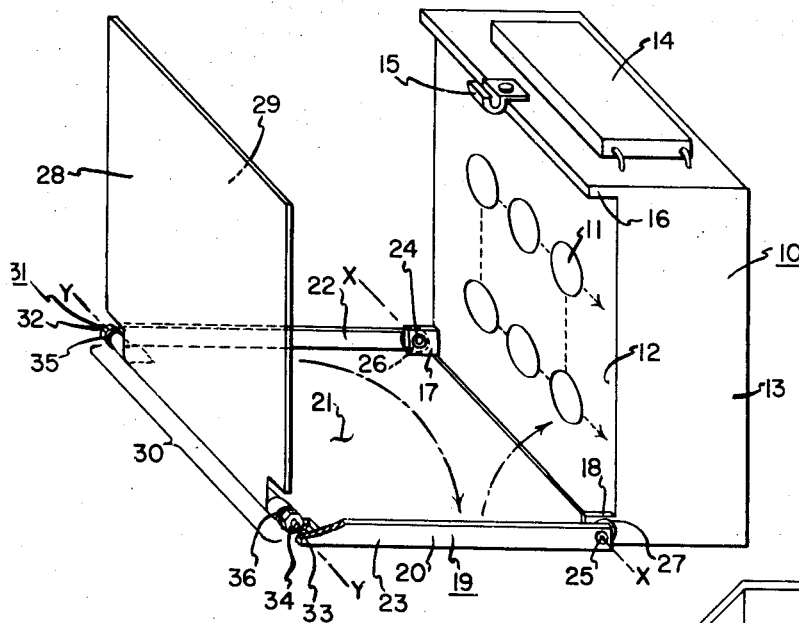
Figure 1 is a perspective view of a versatile, solar powered portable radio receiver incorporating a novel reflective means according to the present invention.

In Figure 1, portable radio receiver 10 incorporates at least one or a plurality of electrically intercoupled solar cells 11 fixedly disposed with respect to back portion 12 of receiver 10. Back portion 12 may constitute an integral portion of plastic case 13, provided additionally with handle 14, catch element 15 mounted upon top flange 16, and mounting tabs 17 and 18. Member 19 may comprise channel element 20 and reflective element 21 affixed thereto. Channel element 20 may be a molded plastic part matching case 13, and may be leather covered if desired. Channel element 20 includes side flanges 22 and 23 which may be rotatably affixed to mounting tabs 17 and 18 of case 13 by eyelet rivets 24 and 25 and spring washers 26 and 27. Member 28 is provided with inner reflective surface 29 and is hingedly affixed to element 21 (or, if preferred, to channel element 20) in semi-friction lock relationship. Hinge portions 30 of member 28 and element 21 may either be stamped out and rolled back in a conventional manner or may comprise separate hinge-half elements flush riveted in a conventional manner to element 21 and member 28. In all events, the intercooperating hinge-half portions are provided with centrally disposed pin 31 having head portion 32 and threaded end portion 33. Disposed upon threaded end portion 33 is, for example, fiber lock nut 34. Disposed between the hinge halves and head portion 32 and fiber lock nut 34 are spring washers 35 and 36. Member 28 and element 21 may be provided with relief areas in the regions of their corners in the immediate proximity of the hinge-half portions 30 so as to accommodate the disposition therewithin of the hinge pin extremities and attachments.

While the apparatus of Figure 1 as shown will lend itself to optimum neatness of appearance, yet it will be understood that element 21 may comprise the sole lower member and channel member 20 may be deleted. In such case, element 21 itself would be affixed to mounting tabs 17 and 18 of case 13.

The apparatus shown and described in Figure 1 operates as follows. As has been heretofore indicated, the intercooperation of element 21 and member 28 is one of a semi-friction lock nature so that one may select a desired angular disposition of member 28 with respect to element 21. If the sun or another light source is disposed directly to the left of the portable radio receiver, one will of course dispose element 21 and member 28 in substantially co-planar relationship so as to obtain maximum photon impingement upon solar cells 11. Thus, member 28 will be rotationally displaced about axis y—y from the disposition shown substantially 90° in a counterclockwise direction, assuming that initially member 28 may be rotated downward so that the solar cells may receive maximum morning sunlight. As the sun commences to rise through the morning hours, one may appropriately displace, rotationally, member 28 in a clockwise direction so that maximum photon impingement upon the solar cells may be achieved. Accordingly, at high noon the disposition of reflected member 28 may be at 45° from the normal of element 21. Rotational displacement in clockwise direction may be further increased for afternoon hours of sunlight. If there is also a semi-friction lock relationship between tabs 17 and 18 and flanges 22 and 23, then for late afternoon hours the bottom member 19 may be rotationally displaced slightly in a clockwise direction about axis x—x so as to obtain optimum reflective sunlight impinging upon solar cells 11. In the case of the presence of the latter semi-friction lock relationship, washers 26 and 27 may be deleted if desired.

Of interest is the manner of obtaining the semi-friction lock relationship between member 28 and element 21. As is seen, this is accomplished by means of a hinge pin having a threaded end portion provided with a lock nut. For optimum operation, spring washers 35 and 36 are inserted between the head and nut and the associated hinge halves, and the lock nut tightened appropriately. Appropriate materials for member 29 and element 21 might be either aluminum or stainless steel having a thickness of .002 inch, for example.

Figure 2:
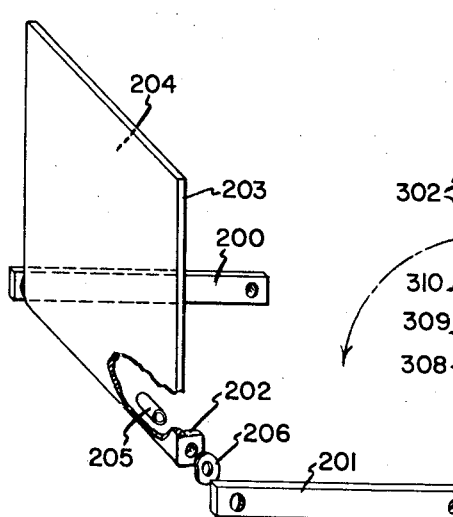
Figures 2 and 3 are additional embodiments of the present invention.

The apparatus in Figure 2 is similar to that of Figure 1 with the exception that the reflective surfaced bottom member is deleted and in lieu thereof are employed arm members 200 and 201, affixed to tabs 17 and 18 in a manner similar to that shown in Figure 1, and also affixed as shown to tabs 202 of member 203 having inner reflective surface 204. The means for attachment between arm members 200 and 201 and member 203 may comprise eyelet rivets 205 and spring washers 206. In operation the apparatus of Figure 2 will be substantially the same as that of the apparatus of Figure 1.

Figure 3:
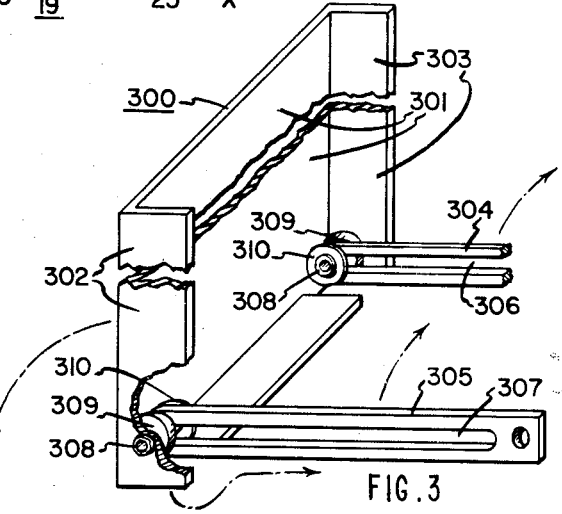

In Figure 3, member 300 having an inner reflective surface 301 is provided with edge flanges 302 and 303. Slotted arms 304 and 305 are provided with slotted apertures 306 and 307 which are longitudinally disposed and cooperate with the attachment means rotatably affixing the slotted arms to the member 300. The attachment means comprise eyelet rivet 308, spacer 309, and spring washers 310, for example. The attachment of slotted arm members 304 and 305 to case 13 of portable radio receiver 10 will be substantially equivalent to the attachment means shown and described in Figure 1.

The apparatus of Figure 3 operates as follows. The eyelet rivet attachment means cooperates with the longitudinally disposed slots of the slotted arm members for selectable extending and closing of the reflective apparatus relative to the receiver case. For all of the three embodiments shown, the catch element of Figure 1 will releasably retain in position the reflective means in proximate relation with the solar cells to protect such solar cells from harm or accident during receiver transportation.

Hence, there is provided by the present invention novel reflective means to be associated with a portable radio receiver, for example; this reflective means may be selectively closable over the solar cells employed by such radio receivers to protect solar cells from damage during intervals of transportation of the radio receiver.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A portable radio receiver including, in combination: a case having a back portion and a back cover adapted to cover said back portion, said back portion being provided with first mounting means having a first axis; a plurality of electrically intercoupled solar cells for providing power for said receiver, said solar cells being fixedly disposed upon said back portion and facing a common direction; said back cover having a reflective surface and second mounting means provided with a second axis spaced from said first axis; extension means rotationally secured to said first and second mounting means whereby said back cover may be rotationally displaced about said first and second axes in order alternatively to reflect light upon said solar cells and to cover said back portion; means affixed to said case for selectively and releasably securing said back cover and said extension means in proximate relationship with respect to said back portion; and reflective means disposed upon said extension means.

2. A portable radio receiver in accordance with claim 1, in which the reflective means disposed upon said extension means comprises a member having a reflective surface, and hinge means intercoupling said member and said back cover, said hinge means including first and second hinge-half portions in semi friction-lock relationship.

3. A portable radio receiver in accordance with claim 2, including a hinge pin intercoupling said hinge-half portions, said hinge pin having a head portion and a threaded end portion, a retaining means threaded onto said threaded end portion, and first and second spring washers interposed between said hinge-half portions and said head portion and retaining means, respectively.

4. A portable radio receiver including, in combination: a case having a back portion and a back cover adapted to cover said back portion, said back portion being provided with first mounting means having a first axis; a plurality of electrically intercoupled solar cells for providing power for said receiver, said solar cells being fixedly disposed upon said back portion and facing a common direction; said back cover having a reflective surface and second mounting means provided with a second axis spaced from said first axis; extension means rotationally secured to said first and second mounting means whereby said back cover may be rotationally displaced about said first and second axes in order alternatively to reflect light upon said solar cells and to cover said back portion; and means affixed to said case for selectively and releasably securing said back cover and said extension means in proximate relationship with respect to said back portion; said back cover being provided with side flanges and said extension means including first and second arm members disposed inwardly with respect to said side flanges; each of said arm members being provided with an interior, longitudinally disposed, slotted aperture cooperating with said second mounting means, said arm members thereby cooperating with said second mounting means in semi friction-lock relationship.

References Cited in the file of this patent

UNITED STATES PATENTS

| | | |
|---|---|---|
| 292,198 | Barstow | Jan. 22, 1884 |
| 593,043 | Cochran et al. | Nov. 2, 1897 |
| 797,891 | Himalaya | Aug. 22, 1905 |
| 1,065,757 | Wilson | June 24, 1913 |
| 1,938,003 | Arthuys et al. | Dec. 5, 1933 |
| 2,444,674 | Rath | July 6, 1948 |
| 2,514,595 | Austin | July 11, 1950 |
| 2,612,817 | Willcox | Oct. 7, 1952 |
| 2,678,582 | Perlin | May 18, 1954 |
| 2,712,772 | Trombe | July 12, 1955 |

OTHER REFERENCES

Radio-Electronics, March 1956, pp. 34–35.